(12) United States Patent
Xu et al.

(10) Patent No.: US 10,990,232 B2
(45) Date of Patent: Apr. 27, 2021

(54) TOUCH PANEL AND MANUFACTURING METHOD THEREOF, AND TOUCH DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Shifeng Xu, Beijing (CN); Ming Hu, Beijing (CN); Ming Zhang, Beijing (CN); Jian Tian, Beijing (CN); Guiyu Zhang, Beijing (CN); Jing Wang, Beijing (CN); Min He, Beijing (CN); Xiaodong Xie, Beijing (CN); Xinbin Tian, Beijing (CN); Yu Zhu, Beijing (CN); Qitao Zheng, Beijing (CN); Chunjian Liu, Beijing (CN); Zouming Xu, Beijing (CN)

(73) Assignees: BOE Technology Group Co., Ltd., Beijing (CN); Hefei Xinsheng Optoelectronics Technology Co., Ltd., Hefei (CN)

(*) Notice: Subject to any disclaimer, the term of this patent is extended or adjusted under 35 U.S.C. 154(b) by 377 days.

(21) Appl. No.: 15/774,904

(22) PCT Filed: Sep. 22, 2017

(86) PCT No.: PCT/CN2017/102817
§ 371 (c)(1),
(2) Date: May 9, 2018

(87) PCT Pub. No.: WO2018/161531
PCT Pub. Date: Sep. 13, 2018

(65) Prior Publication Data
US 2020/0272296 A1    Aug. 27, 2020

(30) Foreign Application Priority Data

Mar. 7, 2017    (CN) .......................... 201710131876.3

(51) Int. Cl.
*G06F 3/044*    (2006.01)
*G06F 3/041*    (2006.01)

(52) U.S. Cl.
CPC ............ *G06F 3/0443* (2019.05); *G06F 3/044* (2013.01); *G06F 3/0446* (2019.05);
(Continued)

(58) Field of Classification Search
CPC ........ G06F 3/041; G06F 3/044; G06F 3/0443; G06F 3/04144; G06F 3/0446;
(Continued)

(56) References Cited

U.S. PATENT DOCUMENTS

2012/0306791 A1* 12/2012 Lee .......................... G06F 3/041
345/173
2014/0062933 A1    3/2014 Coulson et al.
(Continued)

FOREIGN PATENT DOCUMENTS

CN    105866995 A    8/2016
CN    106339129 A    1/2017
(Continued)

OTHER PUBLICATIONS

Jan. 17, 2020—(CN) First Office Action Appn 201710131876.3 with English Translation.
(Continued)

*Primary Examiner* — Abdul-Samad A Adediran
(74) *Attorney, Agent, or Firm* — Banner & Witcoff, Ltd.

(57) ABSTRACT

A touch panel and a manufacturing method thereof, and a touch display device are provided. The touch panel includes a first substrate and a second substrate disposed opposite to
(Continued)

each other, and the first substrate and the second substrate have an interval therebetween. The first substrate includes a first base substrate and a force touch electrode layer disposed on the first base substrate, the force touch electrode layer includes a plurality of independent force touch electrodes. The second substrate includes a second base substrate and a capacitance reference layer disposed on the second base substrate.

16 Claims, 13 Drawing Sheets

(52) U.S. Cl.
CPC ........ *G06F 3/0447* (2019.05); *G06F 3/04144* (2019.05); *G06F 3/04164* (2019.05); *G06F 2203/04103* (2013.01); *G06F 2203/04106* (2013.01)

(58) Field of Classification Search
CPC ............... G06F 3/04164; G06F 3/0447; G06F 2203/04103; G06F 2203/04106

USPC ........................................................ 345/173
See application file for complete search history.

(56) References Cited

U.S. PATENT DOCUMENTS

2017/0371477 A1 12/2017 Chen et al.
2018/0067597 A1* 3/2018 Kim ..................... G06F 3/044

FOREIGN PATENT DOCUMENTS

| | | |
|---|---|---|
| CN | 106371667 A | 2/2017 |
| TW | M526720 U | 8/2016 |
| WO | 2016089149 A1 | 6/2016 |

OTHER PUBLICATIONS

Nov. 10, 2020—(EP) Extended European Search Report Appn 17863302.0.

* cited by examiner

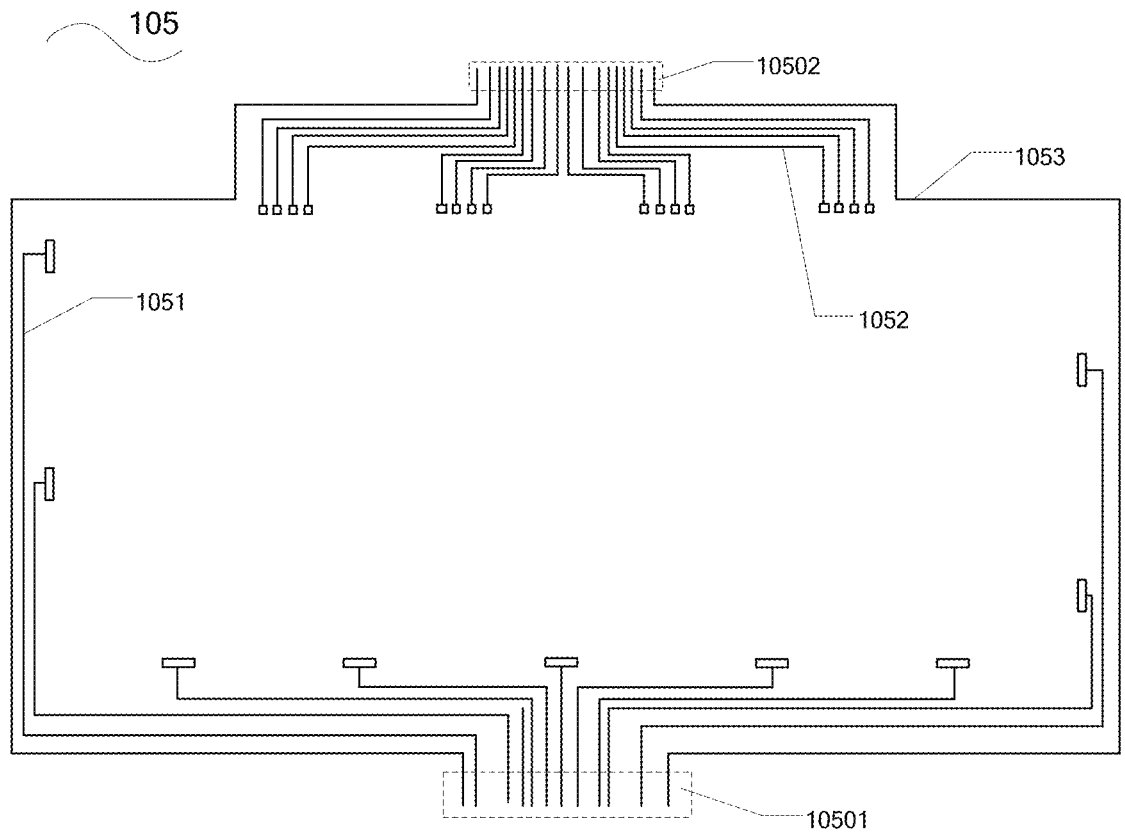

Fig. 10 forming a force touch electrode layer on a first base substrate to prepare a first substrate, the force touch electrode layer comprises a plurality independent force touch electrodes

↓ forming a capacitance reference layer on a second base substrate to prepare a second substrate

↓ disposing the first substrate and the second substrate opposite to each other, so as to form a space between the first substrate and the second substrate

TOUCH PANEL AND MANUFACTURING METHOD THEREOF, AND TOUCH DISPLAY DEVICE

CROSS REFERENCE TO RELATED APPLICATIONS

The application is a U.S. National Phase Entry of International Application No. PCT/CN2017/102817 filed on Sept. 22, 2017, designating the United States of America and claiming priority to Chinese Patent Application No. 201710131876.3 filed on Mar. 7, 2017. The present application claims priority to and the benefit of the above-identified applications and the above-identified applications are incorporated by reference herein in their entirety.

TECHNICAL FIELD

At least one embodiment of the present disclosure relates to a touch panel and a manufacturing method thereof, and a touch display device.

BACKGROUND

Force touch is a hot research topic and a cutting-edge technology in the current electronic touch field, which has a broad application prospect and huge market potential.

A usual force touch has a difficult technological process, a complex structure, and high costs, and the usual force touch process is only used in a few high-end flagship electronic devices. It is extremely unfavorable for the promotion of force touch technology.

SUMMARY

At least one embodiment of the present disclosure relates to a touch panel and a manufacturing method thereof, and a touch display device, so that the structure and manufacturing process of force touch are greatly simplified, the cost is greatly reduced, and the force touch technology is easier to apply and promote.

At least one embodiment of the present disclosure provides a touch panel, including: a first substrate, including a first base substrate and a force touch electrode layer disposed on the first base substrate, the force touch electrode layer includes a plurality of independent force touch electrodes; and a second substrate, including a second base substrate and a capacitance reference layer disposed on the second base substrate; wherein the first substrate and the second substrate are disposed opposite to each other, and interval the first substrate and the second substrate have an interval therebetween.

According to the touch panel provided by an embodiment of the present disclosure, the first substrate further includes a plurality of first touch electrodes and a plurality of second touch electrodes, the plurality of first touch electrodes and the plurality of second electrodes are intersected with each other to form a plurality of force touch unit areas, each of the plurality of force touch electrodes is disposed in one of the plurality of force touch unit areas, the plurality of first touch electrodes, the plurality of second touch electrodes and the plurality of force touch electrodes are insulated from each other.

According to the touch panel provided by an embodiment of the present disclosure, each of the plurality of second touch electrodes includes a plurality of sub-electrodes which are disconnected, adjacent ones of the plurality of sub-electrodes are electrically connected with each other through a bridging line at a disconnection point; the plurality of first touch electrodes, the plurality of sub-electrodes and the plurality of force touch electrodes are disposed in a same layer.

According to the touch panel provided by an embodiment of the present disclosure, the first substrate further includes a force touch wiring layer, the force touch wiring layer includes the bridging line and a plurality of force touch wiring units; the bridging line is disposed at a gap between adjacent ones of the plurality of force touch wiring units; each of the force touch wiring units includes a force touch wiring sub-unit, the force touch wiring sub-unit includes a plurality of force touch wires, in an extending direction of the plurality of force touch wires, lengths of the plurality of force touch wires change in sequence.

According to the touch panel provided by an embodiment of the present disclosure, each of the plurality of force touch wiring units further includes a dummy wiring sub-unit, the dummy wiring sub-unit includes a plurality of dummy wires, in an extending direction of the plurality of dummy wires, lengths of the plurality of dummy wires change in sequence; the extending direction of the plurality of force touch wires is the same as that of the plurality of dummy wires, in a width direction of the plurality of force touch wires, a length change trend of the plurality of force touch wires is opposite to a length change trend of the plurality of dummy wires, the force touch wiring sub-unit and the dummy wiring sub-unit are insulated from each other.

According to the touch panel provided by an embodiment of the present disclosure, further including a peripheral wiring layer, wherein the peripheral wiring layer includes a plurality of peripheral touch wires electrically connected to the plurality of first touch electrodes and the plurality of second touch electrodes respectively, and a plurality of peripheral force touch wires electrically connected to the plurality of force touch wires respectively, a first bonding area of the plurality of peripheral touch wires and a second bonding area of the plurality of peripheral force touch wires are located on opposite sides of the touch panel.

According to the touch panel provided by an embodiment of the present disclosure, the interval includes a gas layer.

According to the touch panel provided by an embodiment of the present disclosure, further including a spacer disposed between the first substrate and the second substrate, and configured to space the first substrate and the second substrate apart.

According to the touch panel provided by an embodiment of the present disclosure, the first substrate or the second substrate has a groove, and the force touch electrode layer or the capacitance reference layer is disposed in the groove.

At least one embodiment of the present disclosure further provides a manufacturing method of a touch panel, including: forming a force touch electrode layer on a first base substrate to prepare a first substrate, the force touch electrode layer comprises a plurality independent force touch electrodes; forming a capacitance reference layer on a second base substrate to prepare a second substrate; and disposing the first substrate and the second substrate opposite to each other, so as to form an interval between the first substrate and the second substrate.

According to the manufacturing method of the touch panel provided by an embodiment of the present disclosure, further including forming a plurality of first touch electrodes and a plurality of second touch electrode body portions simultaneously with forming the force touch electrode layer on the first base substrate, each of the plurality of second touch electrode body portions comprises a plurality of sub-electrodes which are disconnected.

According to the manufacturing method of the touch panel provided by an embodiment of the present disclosure, before forming the force touch electrode layer on the first base substrate, the method further includes forming a force touch wiring layer on the first base substrate, forming a first insulating layer on the force touch wiring layer and forming a first through hole, a second through hole and a third through hole in the first insulating layer, wherein the force touch wiring layer includes a plurality of bridging lines and a plurality of force touch wiring units, each of the plurality of force touch wiring units includes a force touch wiring sub-unit, the force touch wiring sub-unit includes a plurality of force touch wires, in an extending direction of the plurality of force touch wires, lengths of the plurality of force touch wires change in sequence; one end of the plurality of force touch wires is located on the first through hole, the plurality of force touch electrodes are electrically connected to another end of the plurality of force touch wires through the second through hole; the bridging lines are formed in a gap of adjacent ones of the plurality of force touch wiring units, adjacent ones of the sub-electrodes are electrically connected to the plurality of bridging lines corresponding to a disconnection point of the plurality of sub-electrodes; the plurality of second touch electrode body portions are electrically connected to the plurality of bridging lines through the third through hole to form a plurality of second touch electrodes.

According to the manufacturing method of the touch panel provided by an embodiment of the present disclosure, further including forming a dummy wiring sub-unit of each of the plurality of force touch wiring units, the dummy wiring sub-unit comprises a plurality of dummy wires, in an extending direction of the plurality of dummy wires, lengths of the plurality of dummy wires change in sequence; the force touch wiring sub-unit and the dummy wiring sub-unit are insulated from each other.

According to the manufacturing method of the touch panel provided by an embodiment of the present disclosure, after forming the force touch electrode layer, the method further includes forming a peripheral wiring layer, wherein the peripheral wiring layer comprises a plurality of peripheral touch wires electrically connected to the plurality of first touch electrodes and the plurality of second touch electrodes respectively, and a plurality of peripheral force touch wires electrically connected to the plurality of force touch wires respectively, a first bonding area of the plurality of peripheral touch wires and a second bonding area of the plurality of peripheral force touch wires are located on opposite sides of the touch panel.

At least one embodiment of the present disclosure further provides a touch display panel, including a display panel and the touch panel according to any one of the embodiments of the present disclosure on the display panel.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

FIG. 10 is a top view of a peripheral wiring layer of a touch panel provided by an embodiment of the present disclosure;

FIG. 11 is a flow diagram of a manufacturing method of a touch panel provided by an embodiment of the present disclosure;

DETAILED DESCRIPTION

In order to make objects, technical details, and advantages of the embodiments of the present disclosure apparent, the technical solutions of the embodiments of the present disclosure will be described in a clearly and fully understandable way in connection with the drawings related to the embodiments of the disclosure. It is obvious that the described embodiments are just a portion but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
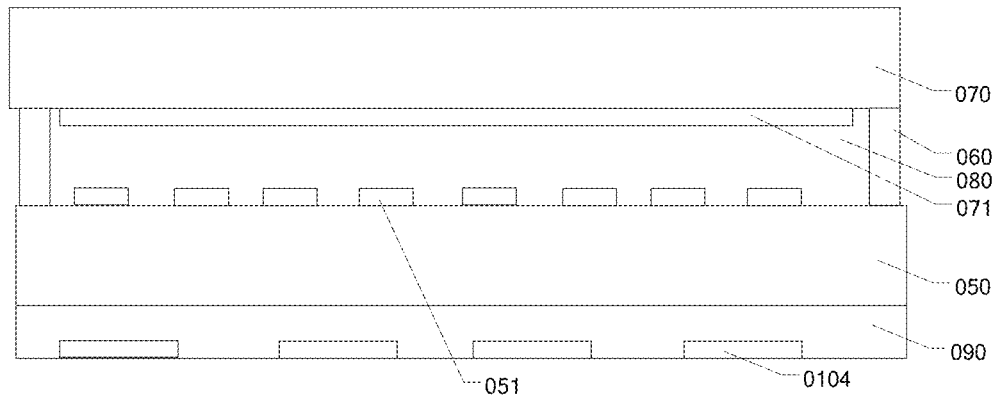
FIG. 1 is a sectional view of a force touch panel.

As illustrated in FIG. 1, in a liquid display device having a force touch function, the liquid display device usually includes an array substrate 050 and an opposing substrate 070 which are cell assembled and a liquid crystal layer 080 sandwiched therebetween. An electric field formed between a pixel electrode 051 and a common electrode 071 drives the liquid crystal molecules in the liquid crystal layer 080 to rotate, so as to achieve display. The array substrate 050 and the opposing substrate 070 can be assembled together by a sealant 060. A separate force touch structure is generally manufactured by forming a force touch sensing electrode layer 0104 under the LCD module, for example, in a backlight module 090, and using the common electrode 071 as a force touch capacitance reference layer. The abovementioned method has a difficult technological process, complex structure, and high cost, and is only used in a few high-end flagship electronic devices. It is extremely unfavorable for the promotion of force touch technology.

Figure 2:
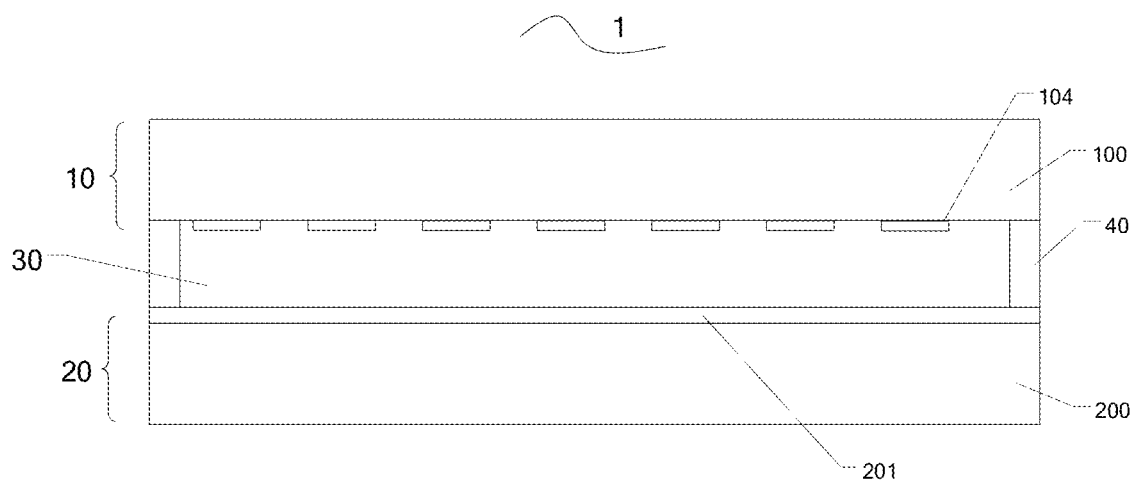
FIG. 2 is a sectional view of a touch panel provided by an embodiment of the present disclosure.

At least one embodiment of the present disclosure provides a touch panel 1, as illustrated in FIG. 2, the touch panel 1 includes a first substrate 10 and a second substrate 20, which are disposed opposite to each other, and the first substrate 10 and the second substrate 20 have an interval therebetween. The first substrate 10 includes a first base substrate 100 and a force touch electrode layer 104 disposed on the first base substrate 100. The second substrate 20 includes a second base substrate 200 and a capacitance reference layer 201 disposed on the second base substrate 200.

Figure 3:
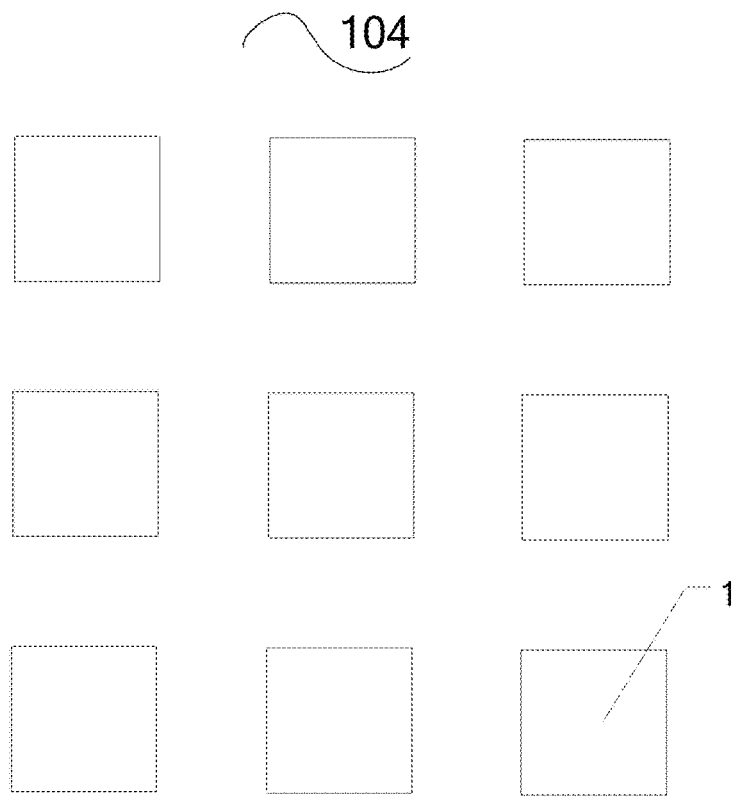
FIG. 3 is a top view of a plurality of force touch electrodes in a touch panel provided by an embodiment of the present disclosure.

For example, as illustrated in FIG. 3, the force touch electrode layer 104 includes a plurality of independent force touch electrodes 1040. The plurality of force touch electrodes 1040 are insulated from each other.

Figure 4:
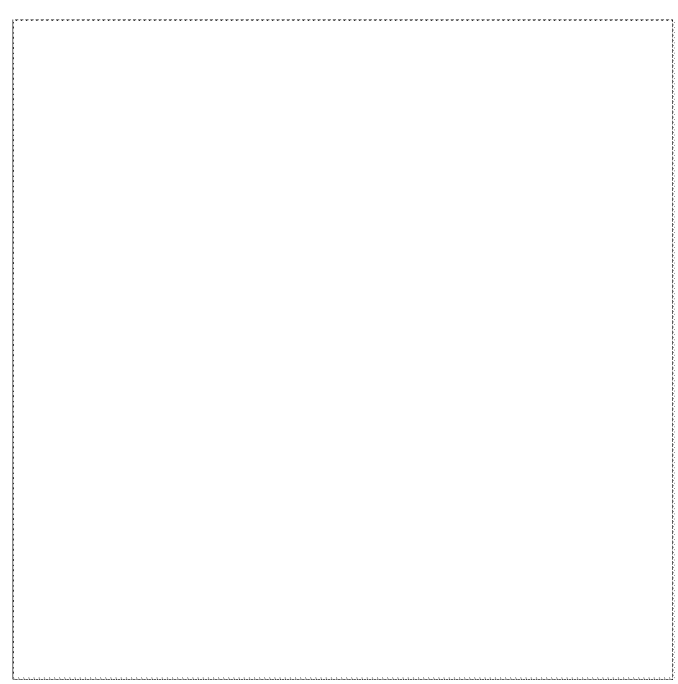
FIG. 4 is a top view of a capacitance reference layer in a touch panel provided by an embodiment of the present disclosure.

For example, as illustrated in FIG. 4, the capacitance reference layer 201 can be a plate electrode. Upon the touch panel being forced, for example, the touch panel being pressed by a finger, a distance between the force touch electrode layer 104 and the capacitance reference layer 201 is changed by the elastic deformation of the first base substrate 100, so as to change the capacitance between the force touch electrodes 1040 and the capacitance reference layer 201, and the size of the force can be recognized by detecting the size of the force touch capacitance by a touch detection chip (IC), thereby achieving the force touch function.

In the touch panel provided by at least one embodiment of the present disclosure, the capacitance reference layer 201 and the force touch electrode layer 104 are respectively disposed on two base substrates, and the technological process is easy to achieve. In this way, the structure and the technological process of force touch are greatly simplified, the cost is greatly reduced, and force touch technology is easier to apply and promote.

In the touch panel according to at least one embodiment of present disclosure, in order to further simplify the technological process, the interval includes a gas layer. For example, the gas layer includes air. Certainly, the interval may not be a gas layer, upon the interval being a gas layer, the gas in the gas layer may not be air, but other gases, embodiments of the present disclosure are not limited thereto.

The touch panel according to at least one embodiment of present disclosure, as illustrated in FIG. 2, further includes a spacer 40 disposed between the first substrate 10 and the second substrate 20, so as to space the first substrate 10 and the second substrate 20 apart.

Figure 5:
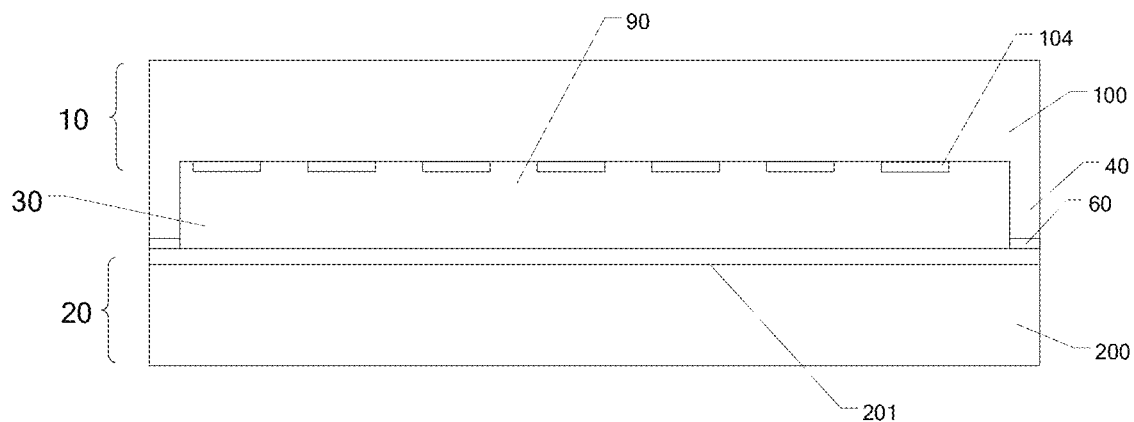
FIG. 5 is a sectional view of a touch panel provided by another embodiment of the present disclosure.

For example, as illustrated in FIG. 5, the first substrate 10 has a groove 90, the force touch electrode layer 104 is disposed in the groove 90, the first substrate 10 having the groove 90 and the second substrate 20 are assembled at the edge by the sealant 60, and the interval 30 is formed therebetween.

Figure 6:
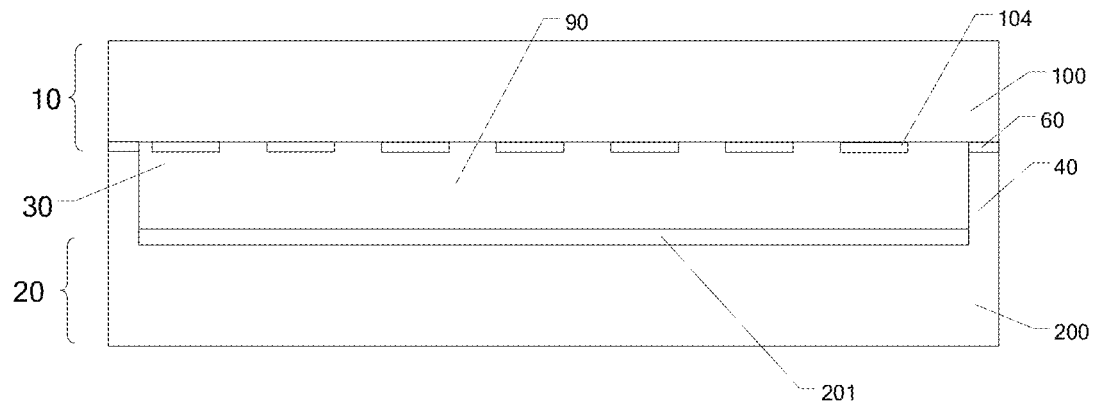
FIG. 6 is a sectional view of a touch panel provided by another embodiment of the present disclosure.

For example, as illustrated in FIG. 6, the second substrate 20 has a groove 90, the capacitance reference layer 201 is disposed in the groove 90, the first substrate 10 and the second substrate 20 having the groove 90 are assembled at the edge by the sealant 60, and the interval 30 is formed therebetween. The arrangement of the groove 90 can facilitate the formation of the interval 30 and facilitate the improvement of the touch function. For example, the spacer 40 can include a sealant and/or a support spacer, but not limited thereto.

Figure 7:
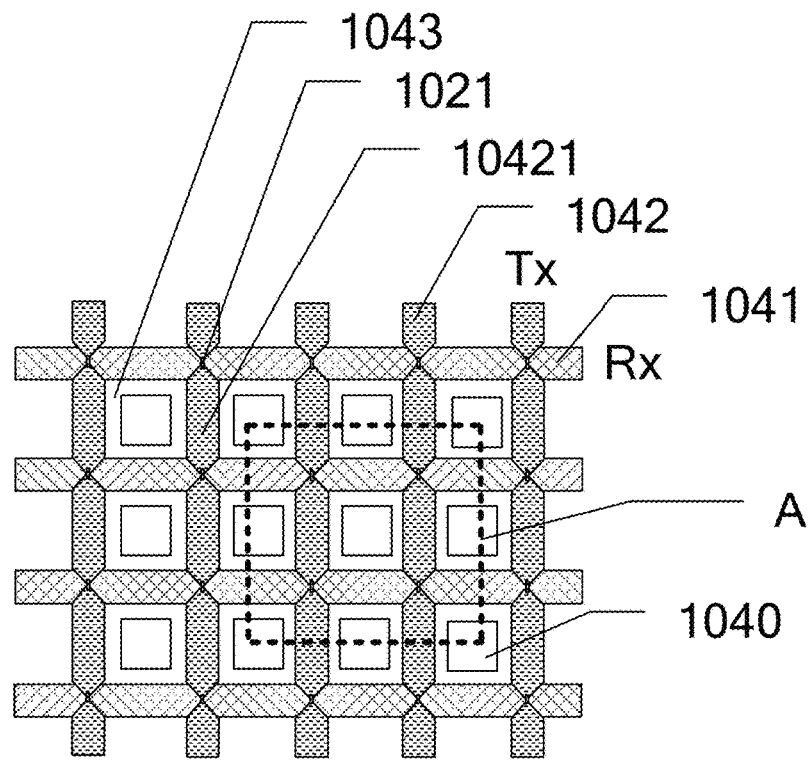
FIG. 7 is a top view of a first touch electrode, a second touch electrode and a force touch electrode of a touch panel provided by an embodiment of the present disclosure.

In the touch panel according to an embodiment of the present disclosure, as illustrated in FIG. 7, the force touch electrode layer 104 further includes a plurality of first touch electrodes 1041 parallel to each other and a plurality of second touch electrodes 1042 parallel to each other, the plurality of first touch electrodes 1041 and the plurality of second electrodes 1042 are intersected with each other to form a plurality of force touch unit areas 1043, each of the plurality of force touch electrodes 1040 is disposed in one of the plurality of force touch unit areas 1043, the plurality of first touch electrodes 1041, the plurality of second touch electrodes 1042 and the plurality of force touch electrodes 1040 are insulated from each other. For example, the plurality of first touch electrodes 1041 are insulated from each other, the plurality of second touch electrodes 1042 are insulated from each other.

Figure 8A:
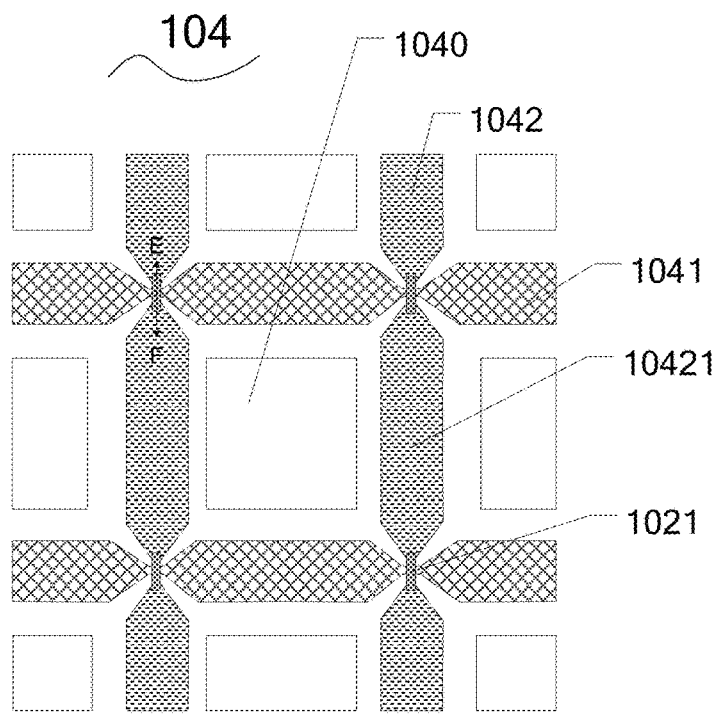
FIG. 8A is an enlarged view of A position in FIG. 7.

For example, as illustrated in FIG. 7 and FIG. 8A, each of the plurality of second touch electrodes 1042 includes a plurality of sub-electrodes 10421 which are disconnected, adjacent ones of the plurality of sub-electrodes 10421 are electrically connected with each other through a bridging line 1021 at a disconnection point. For example, as illustrated in FIG. 8A, the plurality of first touch electrodes 1041, the plurality of sub-electrodes 10421 of the plurality of second touch electrodes 1042 and the plurality of force touch electrodes 1040 are disposed in the same layer to save the technological process.

Figure 8B:
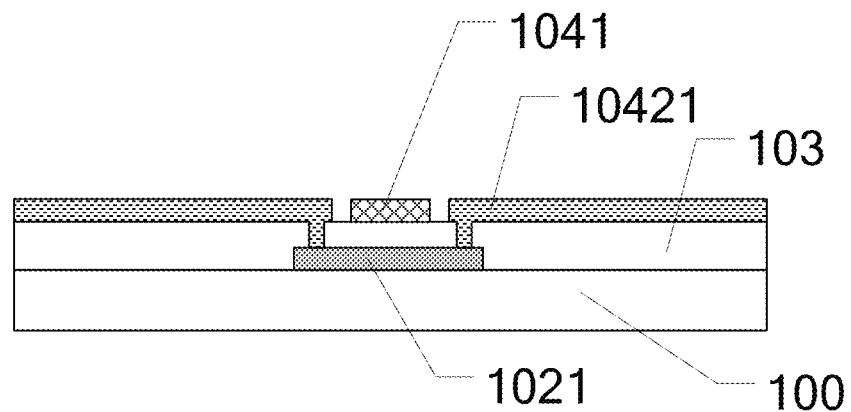
FIG. 8B is a sectional view along a line E-F in FIG. 8A.
Figure 8C:
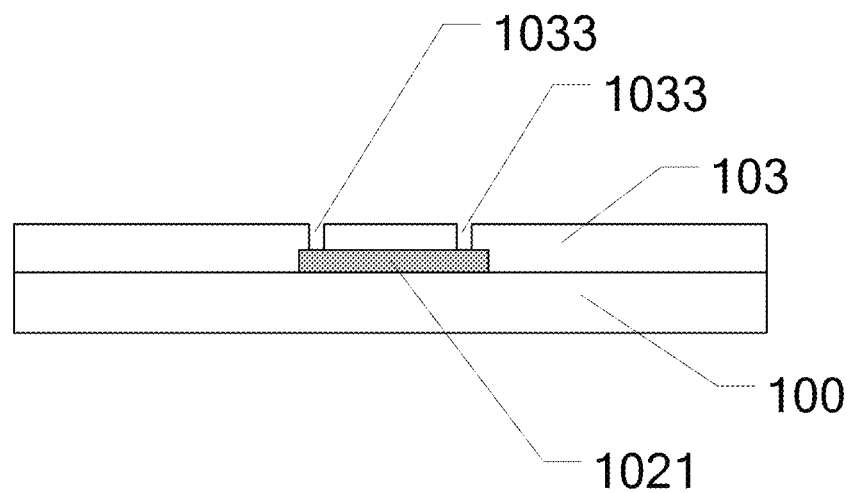
FIG. 8C is a sectional view of a third through hole of a first insulating layer at a position corresponding to a bridging line.

For example, the bridging line 1021 can be disposed on another layer, as illustrated in FIG. 8B and FIG. 8C, the adjacent ones sub-electrodes 10421 are electrically connected to the bridging line 1021 at a corresponding position through third through holes 1033 penetrating the first insulating layer 103 at a disconnection point to achieve the electrical connection. For example, as illustrated in FIG. 8B, the adjacent ones sub-electrodes 10421 are electrically connected to both ends of the bridging line 1021.

For example, as illustrated in FIG. 7, an intersection of the plurality of first touch electrodes 1041 and the plurality of second touch electrodes 1042 forms a capacitor. Upon the finger touching the touch panel, the coupling between a first touch electrode 1041 and a second touch electrode 1042 near a touch point is affected, so that the capacitance between the first touch electrode 1041 and the second touch electrode 1042 is changed. The touch detection chip determines the touch position by detecting the change of the capacitance value. The first touch electrode 1041 can be as a sensing electrode (RX), the second touch electrode 1042 can be as a driving electrode (TX), but not limited thereto. The first touch electrode 1041 can also be used as a driving electrode, and the second touch electrode 1042 can also be used as a sensing electrode.

Figure 9:
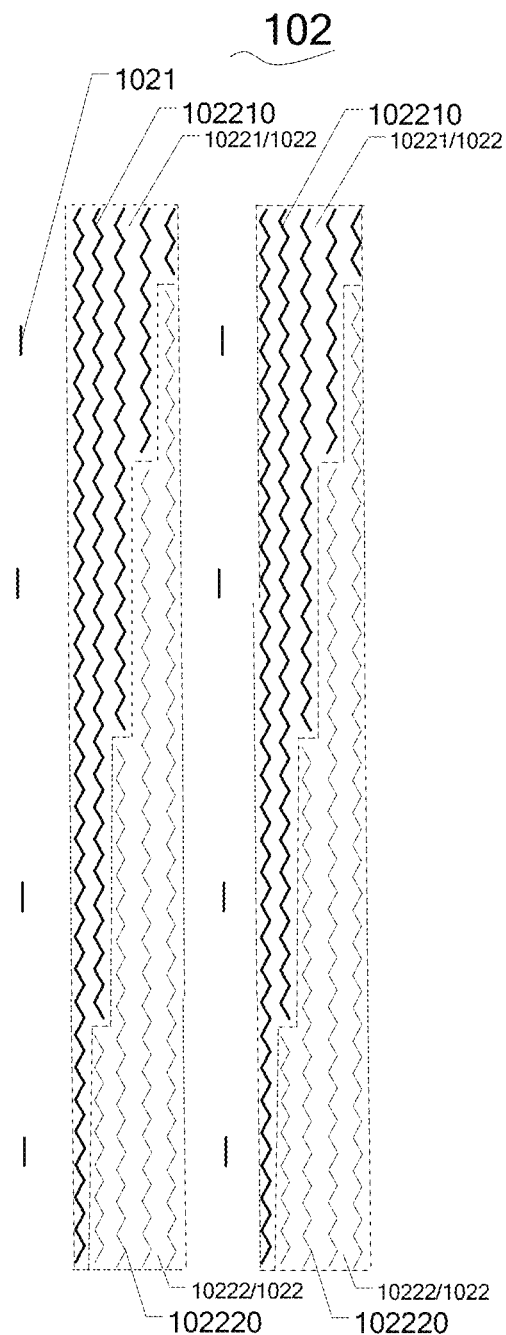
FIG. 9 is a top view of a touch wiring layer on a touch panel provided by an embodiment of the present embodiment.

In the touch panel according to an embodiment of the present disclosure, as illustrated in FIG. 9, the first substrate 10 further includes a force touch wiring layer 102, the force touch wiring layer 102 further includes a plurality of force touch wiring units 1022 in addition to the bridging line 1021 to save the process; and the bridging line 1021 is disposed at a gap between adjacent ones of the plurality of force touch wiring units 1022.

For example, as illustrated in FIG. 9, each of the force touch wiring units 1022 includes a force touch wiring sub-unit 10221 and a dummy wiring sub-unit 10222, the force touch wiring sub-unit 10221 includes a plurality of force touch wires 102210 of which lengths change in sequence. For example, in an extending direction of the force touch wires 102210, lengths of the plurality of force touch wires 102210 change in sequence. For example, the change in sequence includes increasing in sequence or decreasing in sequence. For example, the plurality of force touch wires 102210 are insulated from each other. For example, the spacing between the adjacent ones of the force touch wires 102210 can be 30 microns, but not limited thereto. The dummy wiring sub-unit 10222 includes a plurality of dummy wires 102220 of which lengths change in sequence. For example, the plurality of dummy wires 102220 are insulated from each other. The extending direction of the force touch wires 102210 is the same as that of the of dummy wires 102220, in a width direction of the force touch wires 102210, a length change trend of the plurality of force touch wires 102210 is opposite to a length change trend of the plurality of dummy wires 102220. For example, a width direction of the force touch wires 102210 can include left to right and right to left, as illustrated in FIG. 9, in a left-to-right width direction of the force touch wires 102210, the length change trend of the plurality of force touch wires 102210 is gradually shorter, and the length change trend of the plurality of dummy wires 102220 is gradually longer. The arrangement of the plurality of dummy wires 102220 can increase the uniformity of the capacitance and enhance the blanking effect. The plurality of dummy wires 102220 and the plurality of force touch wires 102210 can be disposed in a zigzag shape so as to avoid generating the optical moire pattern and further enhance the blanking effect. The width of the wires can be increased by making use of the space so as to reduce the impedance of the wires. For example, the spacing between the adjacent dummy wires 102220 can be 30 microns, but not limited thereto. The force touch wiring layer 102 cannot be provided with the plurality of dummy wires 102220, the embodiment of the present disclosure is not limited thereto.

For example, as illustrated in FIG. 9, the force touch wiring sub-unit 10221 of each of the force touch wiring units 1022 and the dummy wiring sub-unit 10222 can be symmetrical. That is, the plurality of force touch wires 102210 and the plurality of dummy wires 102220 can be symmetrical.

For example, as illustrated in FIG. 9, the force touch wiring units 1022 can have a shape of a rectangular, the force touch wiring sub-unit 10221 has a shape of triangle with a stepped hypotenuse, the dummy wiring sub-unit 10222 has a shape of triangle with a stepped hypotenuse, the force touch wiring sub-unit 10221 and the dummy wiring sub-unit 10222 complement each other to form a force touch wiring unit 1022 with a rectangular shape. The force touch wiring sub-unit 10221 and the dummy wiring sub-unit 10222 are insulated from each other. That is, the plurality of force touch wires 102210 and the plurality of dummy wires 102220 are insulated from each other.

Figure 13:
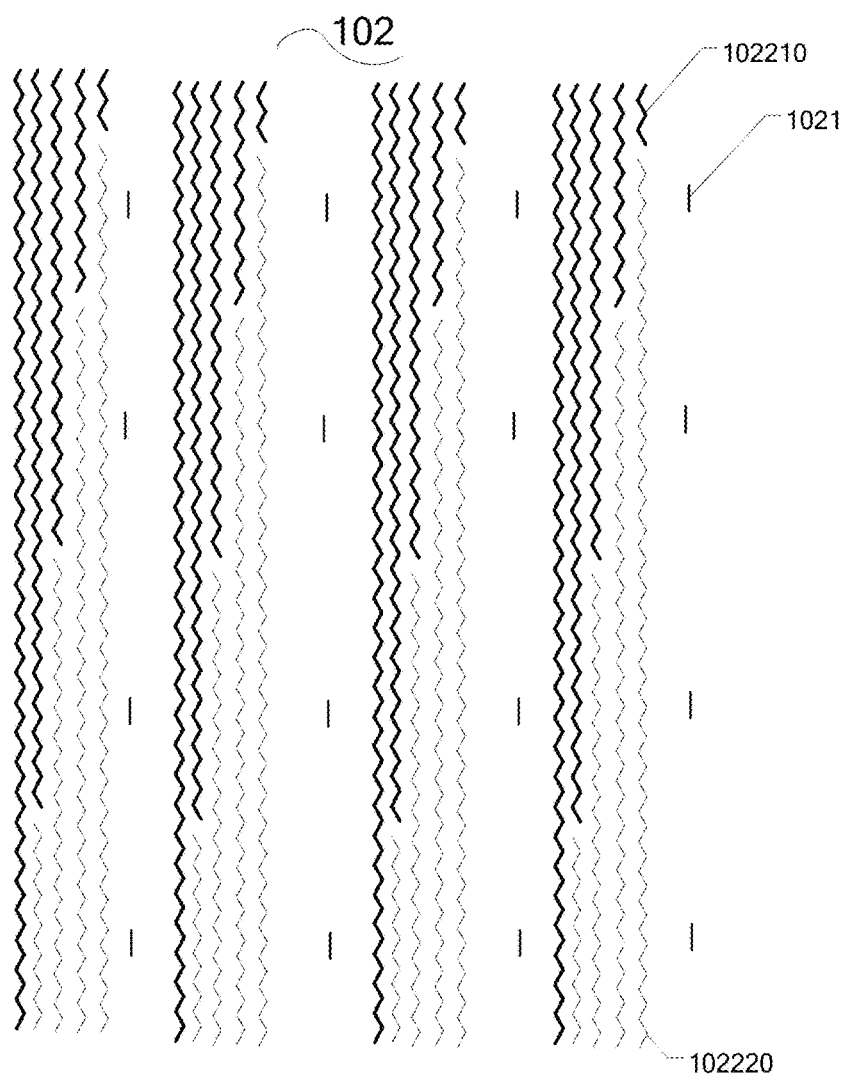
FIG. 13 is a top view of a touch wiring layer formed in a manufacturing method of a touch panel provided by an embodiment of the present disclosure.
Figure 14:
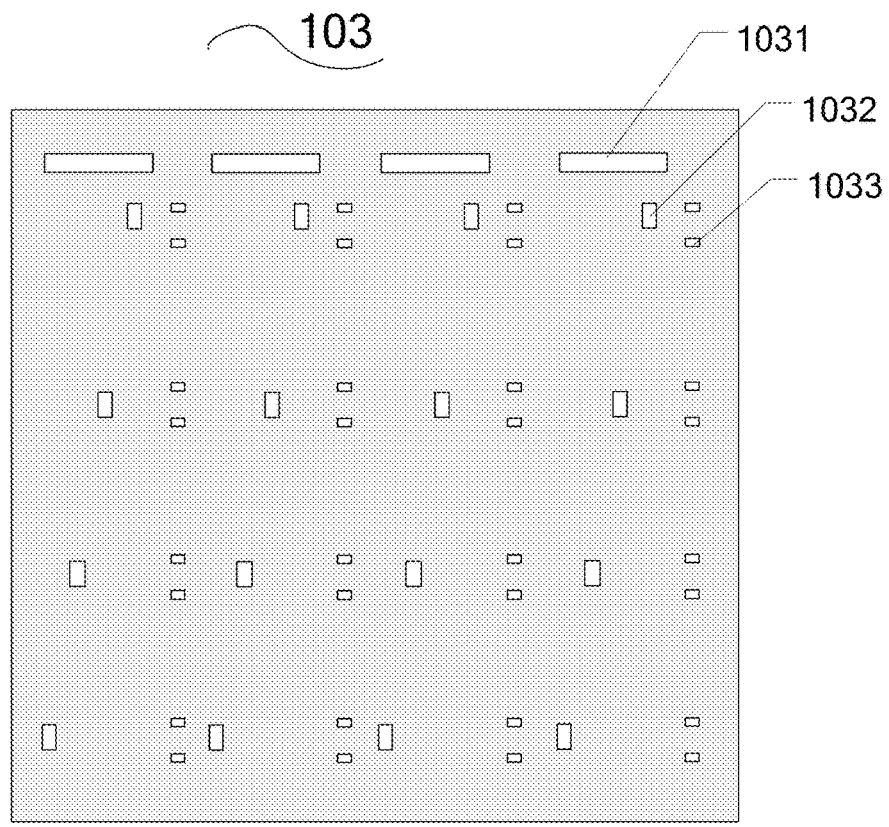
FIG. 14 is a top view of a first insulating layer formed in a manufacturing method of a touch panel provided by an embodiment of the present disclosure.
Figure 16:
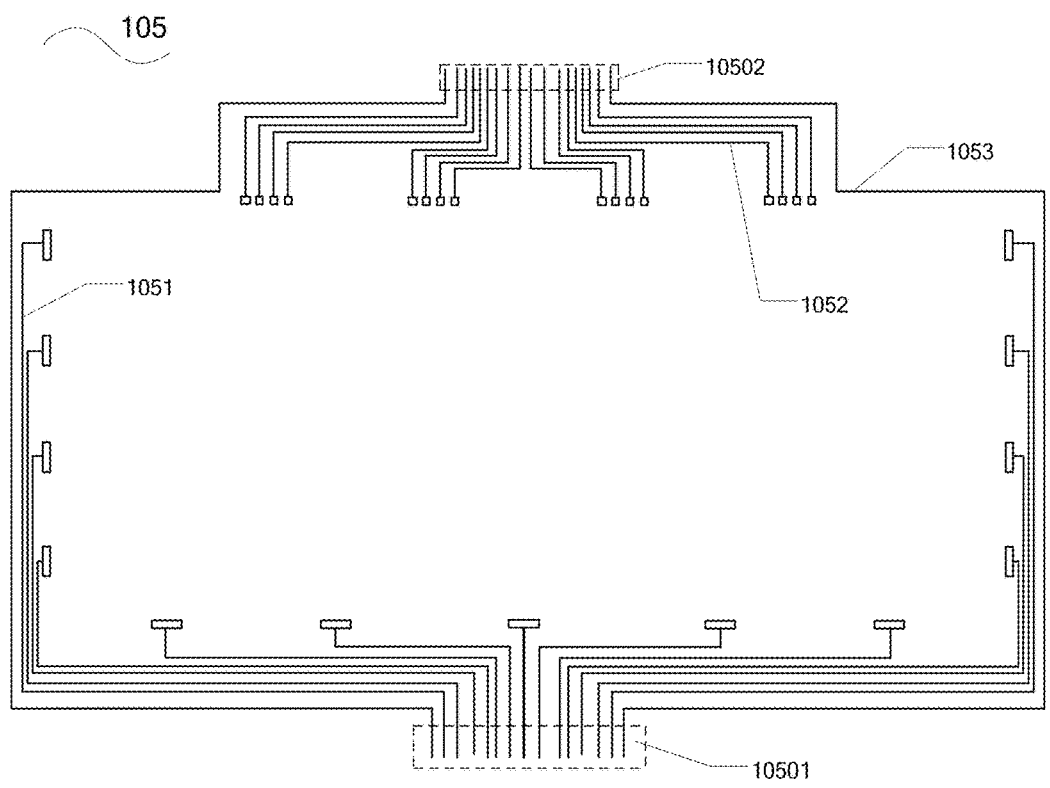
FIG. 16 is a top view of a peripheral wiring layer formed in a manufacturing method of a touch panel provided by an embodiment of the present disclosure.

For example, an upper of the force touch wires 102210 can be electrically connected to peripheral touch wires 1051 through first through holes 1031 penetrating the first insulating layer 103, a lower end of the force touch wires 102210 can be electrically connected to the force touch electrodes 1040 through second through holes 1032 penetrating the first insulating layer 103 (refer to FIG. 13, FIG. 14 and FIG. 16).

The touch panel according to an embodiment of the present disclosure, as illustrated in FIG. 10, which further includes a peripheral wiring layer 105, the peripheral wiring layer 105 includes a plurality of peripheral touch wires 1051 electrically connected to the plurality of first touch electrodes 1041 and the plurality of second touch electrodes 1042 respectively, and a plurality of peripheral force touch wires 1052 electrically connected to the plurality of force touch wires 102210 respectively, a first bonding area 10501 of the plurality of peripheral touch wires 1051 and a second bonding area 10502 of the plurality of peripheral force touch wires 1052 are located on opposite sides of the touch panel so as to facilitate achieving a narrow bezel. For example, the peripheral wiring layer 105 can further include a ground wire 1053. For example, the peripheral wiring layer 105 can be made of metal material. For example, the peripheral touch wires 1051 can be electrically connected to the corresponding first touch electrodes 1041 or second touch electrodes 1042 directly, the peripheral force touch wires 1052 can be electrically connected to the force touch wires 102210 through the first through holes 1031 penetrating the first insulating layer 103 (refer to FIG. 13 and FIG. 14).

Figure 12:
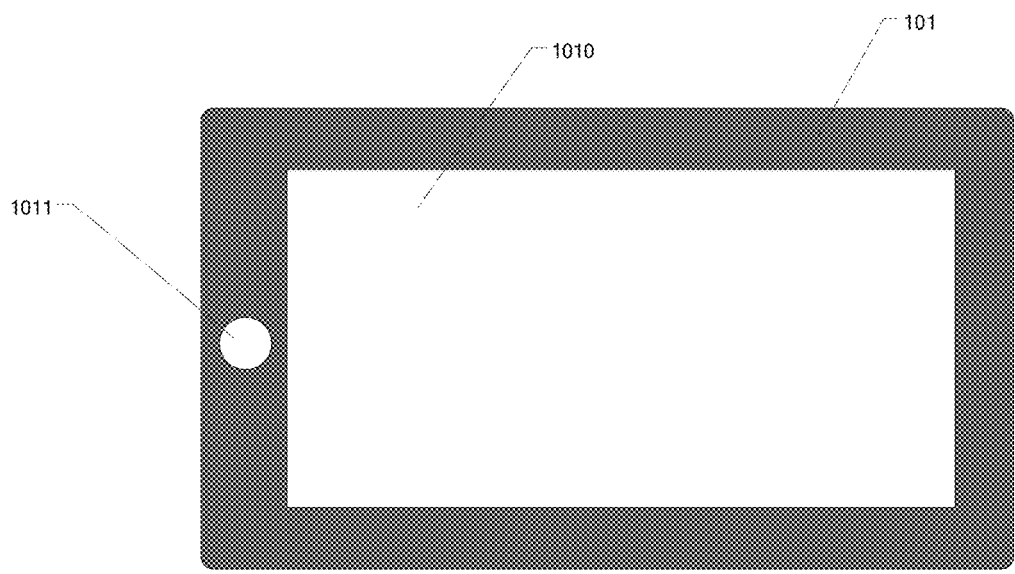
FIG. 12 is a top view of a black matrix formed on a first base substrate in a manufacturing method of a touch panel provided by an embodiment of the present disclosure.

The touch panel according to an embodiment of the present disclosure, further includes a black matrix 101, a top view of the black matrix 101 is illustrated in FIG. 12.

In the touch panel according to an embodiment of the present disclosure, a first touch detection chip can be electrically connected to the plurality of peripheral touch wires 1051 of the first bonding area 10501, a second touch detection chip can be electrically connected to the plurality of peripheral force touch wires 1052 of the second bonding area 10502. The functions of the first touch detection chip and the second detection chip can be integrated in one touch detection chip, and the embodiments of the present disclosure are not limited thereto.

At least one embodiment of the present disclosure provides a manufacturing method of a touch panel, as illustrated in FIG. 11, the method includes the following steps.

Forming a force touch electrode layer 104 on a first base substrate 100 to prepare a first substrate 10, the force touch electrode layer 104 includes a plurality independent force touch electrodes 1040.

Forming a capacitance reference layer 201 on a second base substrate 201 to prepare a second substrate 20.

Disposing the first substrate 10 and the second substrate 20 oppositely, so as to form an interval between the first substrate 10 and the second substrate 20.

In the manufacturing method provided by at least one embodiment of the present disclosure, the capacitance reference layer 201 and the force touch electrode layer 104 are respectively disposed on two base substrates, and the technological process is easy to achieve. The structure and the technological process of the force touch are greatly simplified, the cost is greatly reduced, and force touch technology is easier to apply and promote.

In the manufacturing method of the touch panel according to an embodiment of the present disclosure, as illustrated in FIG. 12, the fabrication of the first substrate 10 includes the following steps:

Step S1: as illustrated in FIG. 12, forming a black matrix 101 on the first base substrate 100 (not illustrated in FIG. 12) to prevent light leakage. The center of the black matrix 101 is scooped, an area surrounded by the black matrix 101 can be a display area (a view area) 1010. For example, a pattern of the black matrix 101 can be provided with a hollow area 1011 as a function hole of a camera, a light emitting area and so on. For example, the black matrix 101 can be made by technological processes of gluing, exposure, and development.

Step S2: as illustrated in FIG. 13, after forming the black matrix 101, the force touch wiring layer 102 is formed. For example, the force touch wiring layer 102 can be formed by technological processes of film formation, cleaning, gluing, exposure, development, etching, peeling, and cleaning. The formed force touch wiring layer 102 can refer to FIG. 9. For example, the material of the force touch wiring layer 102 can be transparent conductive oxide, such as indium tin oxide (ITO).

As illustrated in FIG. 9 and FIG. 13, the force touch wiring layer 102 includes a plurality of bridging lines 1021 and a plurality of force touch wiring units 1022. The bridging lines 1021 are disposed in a gap between the adjacent force touch wiring units 1022.

As illustrated in FIG. 9, each of the force touch wiring units 1022 includes a force touch wiring sub-unit 10221 and a dummy wiring sub-unit 10222, the force touch wiring sub-unit 10221 includes a plurality of force touch wires 102210 of which lengths are changed in sequence, the dummy wiring sub-unit 10222 includes a plurality of dummy wires 102220 whose lengths are changed in sequence. For example, in an extending direction of the dummy wires 102220, lengths of the plurality of dummy wires 102220 change in sequence. The extending direction of the force touch wires 102210 is the same as the extending direction of the dummy wires 102220, in a width direction of the force touch wires 102210, a length change trend of the plurality of force touch wires 102210 is opposite to a length change trend of the plurality of dummy wires 102220, the force touch wiring sub-unit 10221 and the dummy wiring sub-unit 10222 are insulated from each other.

For example, as illustrated in FIG. 9 and FIG. 13, in order to enhance the blanking effect, a line breadth of the force touch wires 102210 and a line breadth of the dummy wires 102220 can be the same, a distance of the adjacent force touch wires 102210 and a distance of the adjacent dummy wires 102220 can be the same.

Step S3: as illustrated in FIG. 14, the first insulating layer 103 is formed after forming the force touch wiring layer 102. For example, the first insulating layer 103 can be formed by technological processes of gluing, exposure and development. The first insulating layer 103 is fully formed on the first substrate, first through holes 1031 corresponding to upper ends of the force touch wires, second through holes 1032 corresponding to lower ends of the force touch wires, and third through holes 1033 corresponding to the bridging lines are formed in the first insulating layer 103.

Figure 15A:
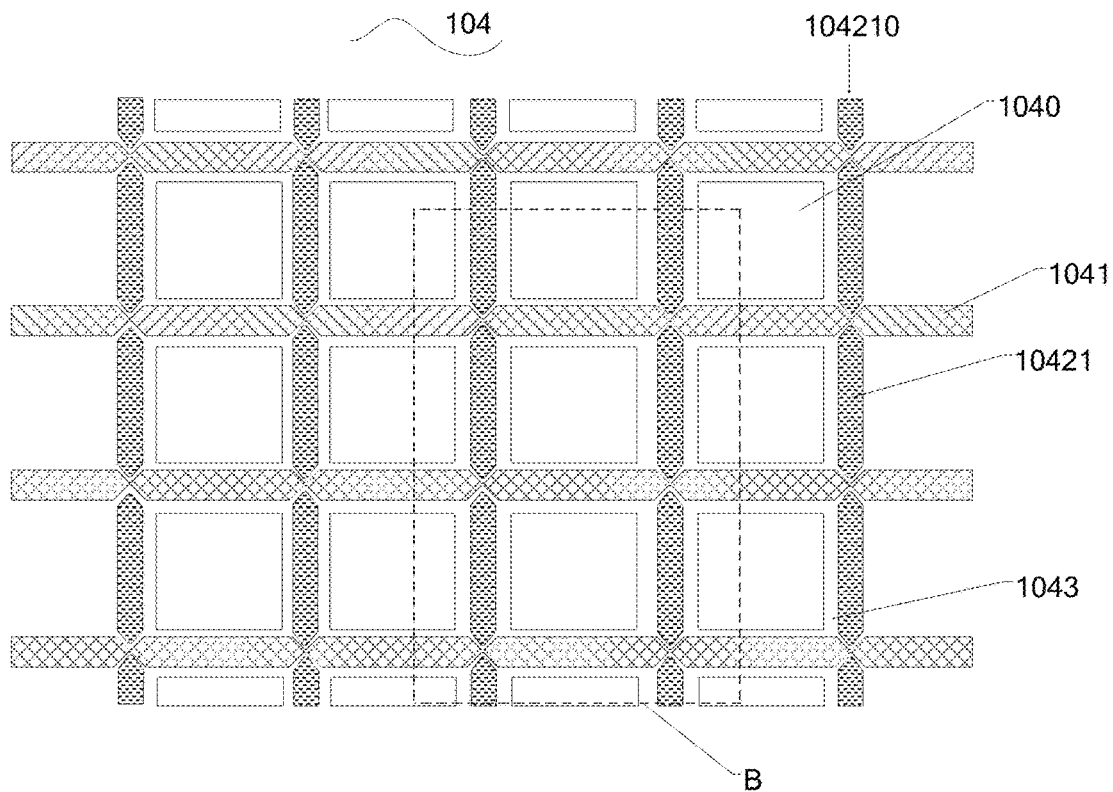
FIG. 15A is a top view of a force touch electrode layer formed in a manufacturing method of a touch panel provided by an embodiment of the present disclosure.
Figure 15B:
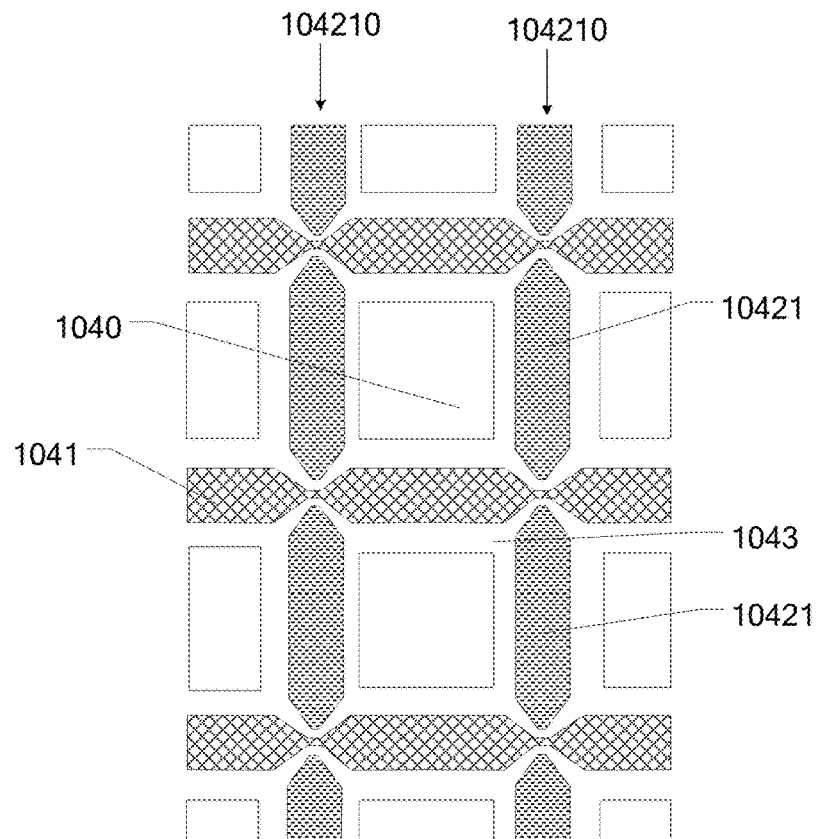
FIG. 15B is an enlarged view of B position in FIG. 15 A.

Step S4: as illustrated in FIG. 15A and FIG. 15B, the force touch electrode layer 104 is formed after forming the first insulating layer 103, the force touch electrode layer 104 includes a plurality of force touch electrodes 1040, a plurality of first touch electrodes 1041 parallel to each other and a plurality of second touch electrode body portions 104210 parallel to each other, each of the second touch electrode body portions 104210 includes a plurality of sub-electrodes 10421 which are disconnected.

For example, adjacent ones of the sub-electrodes 10421 are electrically connected to the corresponding bridging lines 1021 at a disconnection point through the three holes 1033, therefore, the sub-electrodes 10421 in the same column can be electrically connected together; the second touch electrode body portions 104210 and the bridging lines 1021 electrically connected thereto form second touch electrodes 1042. The formed second touch electrodes 1042 can refer to FIG. 7.

For example, as illustrated in FIG. 15A and FIG. 15B, the extending direction of the first touch electrodes 1041 crosses the extending direction of the second touch electrode body portions 104210, a plurality of force touch unit areas 1043 are formed between the plurality of first touch electrodes 1041 and the plurality of second touch electrode body portions 104210, each of the force touch electrodes 1040 is formed in one of the plurality of force touch unit areas 1043, the plurality of first touch electrodes 1041, the plurality of second touch electrode body portions and the plurality of force touch electrodes 1040 are disposed in the same layer.

For example, the force touch electrodes 1040 are electrically connected to the force touch wires 102210 through the second through holes 1032.

Step S5: after forming the force touch electrode layer 104, the plurality of first touch electrodes 1041 parallel to each other and the plurality of second touch electrode body portions 104210, and the force touch electrode layer 104, the method further includes forming a peripheral wiring layer 105, the formed peripheral wiring layer 105 can be illustrated in FIG. 16.

For example, the peripheral wiring layer 105 includes a plurality of peripheral touch wires 1051 electrically connected to the plurality of first touch electrodes 1041 and the plurality of second touch electrodes 1042 respectively, and a plurality of peripheral force touch wires 1052 electrically connected to the plurality of force touch wires respectively, a first bonding area 10501 of the plurality of peripheral touch wires 1051 and a second bonding area 10502 of the plurality of peripheral force touch wires 1052 are located on opposite sides of the touch panel. For example, the peripheral wiring layer 105 can further include a ground wire 1053.

The formed peripheral wiring layer 105 can also be illustrated in FIG. 10, but the embodiment of the present disclosure is not limited thereto. The touch effect can be improved upon two sides of the touch electrodes (including the first touch electrodes and the second touch electrodes) being connected with the peripheral touch wires 1051.

For example, the peripheral force touch wires 1051 can be connected to the upper ends of the force touch wires 102210 through the first through holes 1031.

Figure 17:
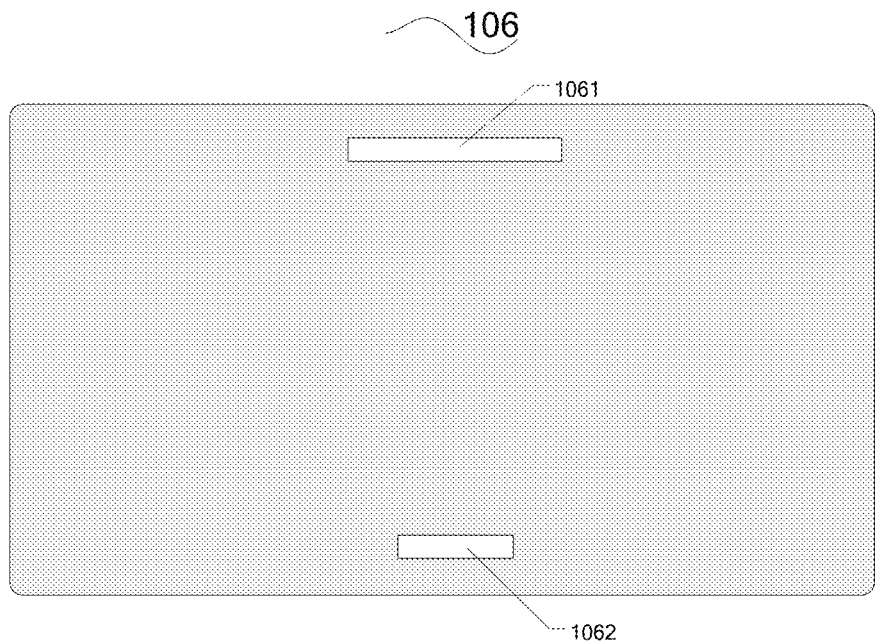
FIG. 17 is a top view of a second insulating layer formed in a manufacturing method of a touch panel provided by an embodiment of the present disclosure.

Step S6: Forming a second insulating layer 106 after forming the plurality of peripheral touch wires 1051, as illustrated in FIG. 17, for example, the second insulating layer 106 can be as a blanking layer, the material of the second insulating layer 106 can be SiNO.

For example, areas of the second insulating layer 106 corresponding to the first bonding area 10501 and the second bonding area 10502 are scooped to form fourth through holes 1061 and fifth through holes 1062.

Figure 18:
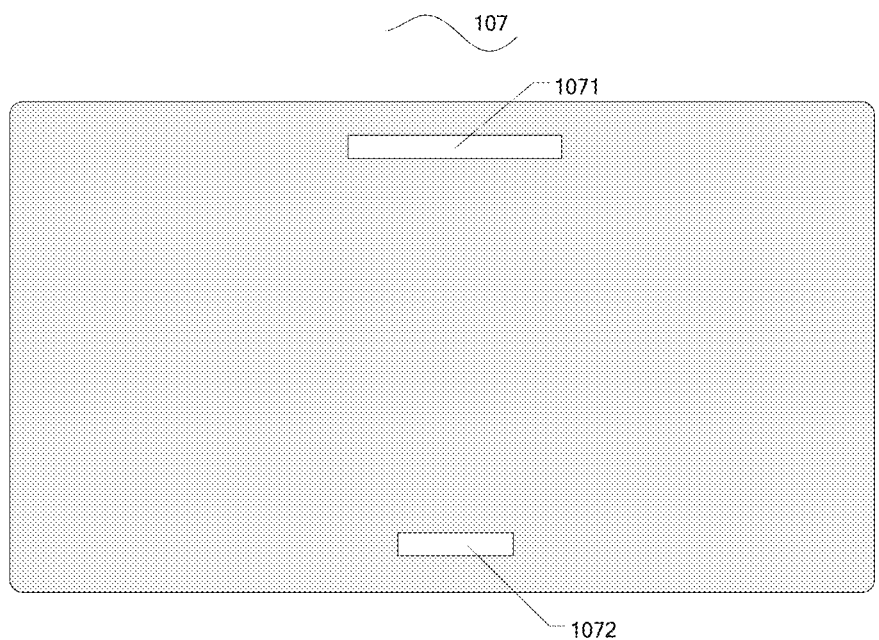
FIG. 18 is a top view of a third insulating layer formed in a manufacturing method of a touch panel provided by an embodiment of the present disclosure.

Step S7: forming a third insulating layer 107 on the second insulating layer 106, as illustrated in FIG. 18, the third insulating layer 107 fully covers the peripheral touch wires to prevent the metal from etching and enhances the anti-electro-static discharge (ESD) of the second substrate, at the same time, the third insulating layer 107 can be as an insulating layer for isolating the force touch electrode layer 104 and the capacitance reference layer 201.

In this moment, the third insulating layer 107 can be etched to form sixth through holes 1071 corresponding to the first bonding area 10501 and seventh through holes 1072 corresponding to the second bonding area 10502, so as to expose the first bonding area 10501 and the second bonding area 10502 to bond an external circuit. For example, the external circuit includes a flexible printed circuit (FPC).

For example, materials of the second insulating layer 106 and the third insulating layer 107 can be organic transparent insulating material.

For example, the fourth through holes 1061 and the fifth through holes 1062 can be formed by a method of a screen printing etching paste after forming the sixth through holes 1071 and the seventh through holes 1072.

Figure 19:
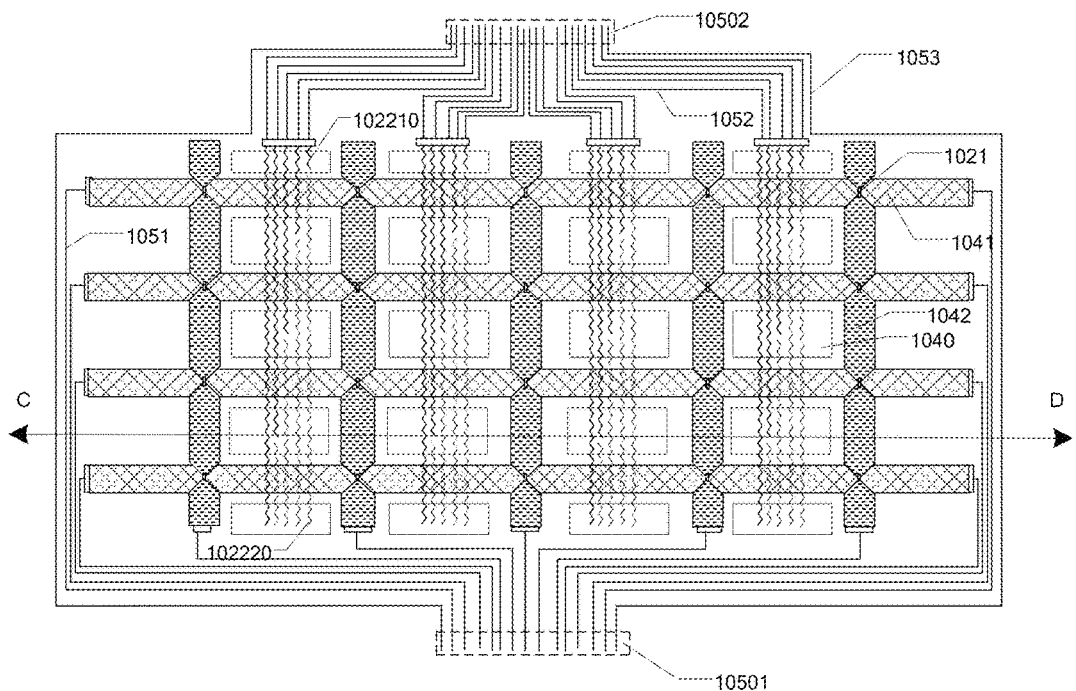
FIG. 19 is a top view of a first substrate formed in a manufacturing method of a touch panel provided by an embodiment of the present disclosure.
Figure 20:
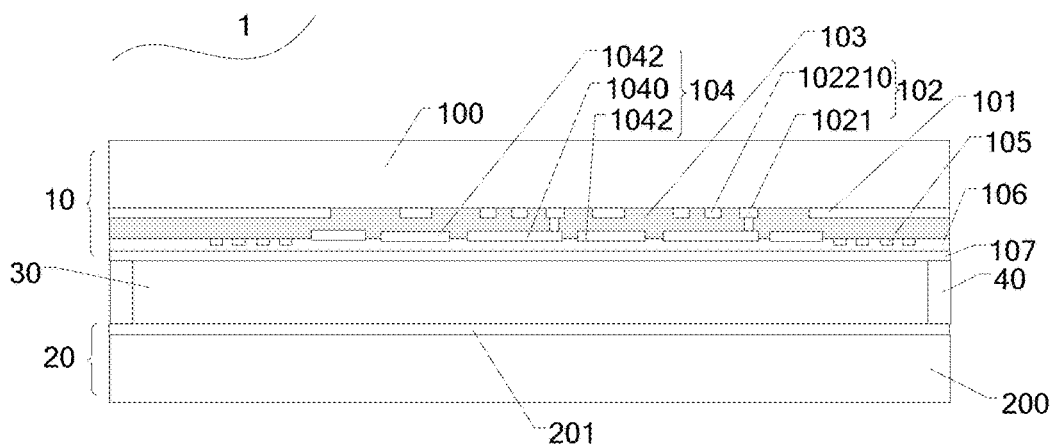
FIG. 20 is a sectional view of CD position in FIG. 19.

A planar view of the formed first substrate can be illustrated in FIG. 19, the touch panel including the substrate can be illustrated in FIG. 20.

The abovementioned method provided by embodiments of the present disclosure can be adjusted according to requirements of the touch panel, and at least one layer can be changed, replaced or adjusted. The product provided by embodiments of the present disclosure can be formed by embodiments of the present disclosure. The same or similar parts are not repeated.

Figure 21:
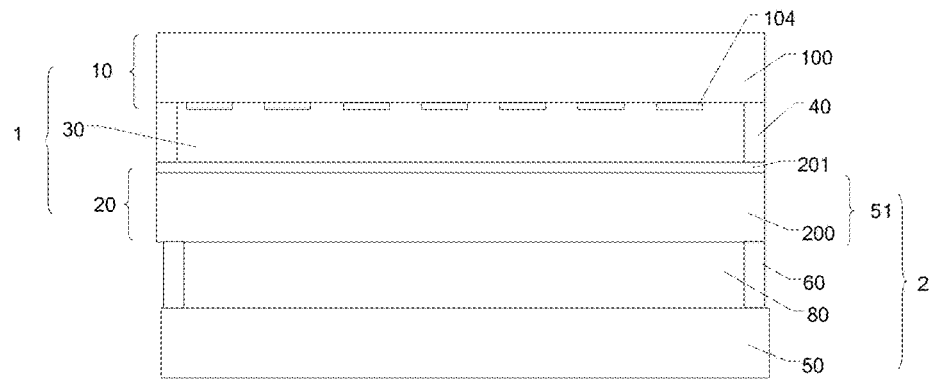
FIG. 21 is a sectional view of a touch display device provided by an embodiment of the present disclosure.

At least one embodiment of the present disclosure provides a touch display device, as illustrated in FIG. 21, the touch display panel includes a display panel 2 and any touch panel 1 according to the abovementioned embodiments disposed on the display panel 2. The display panel 2 includes a third substrate 50 and an opposing substrate 51 disposed opposite to each other and a liquid crystal layer 80 disposed between the third substrate 50 and the opposing substrate 51. For example, the third substrate 50 can be an array substrate, the opposing substrate 51 can be a color film substrate, but not limited thereto.

According to the touch display device provided by an embodiment of the present disclosure, as illustrated in FIG. 21, the display panel 2 includes a third substrate 50, the third substrate 50 and the second substrate 20 are disposed opposite to each other, the display panel 2 and the touch panel 1 share the second substrate 20. The second substrate 20 can be the opposing substrate of the display panel 2, and also serve as the first substrate 10 of the touch panel 1.

The first substrate 10 can be a one glass solution (OGS) substrate. The force touch electrode layer 104 can be made on the opposing substrate or the OGS substrate by a single layer on cell (SLOC) manner. Upon the force touch electrode layer 104 being made on the OGS substrate, the force touch electrode layer 104 can be made on the same layer as the first touch electrodes 1041 and the second touch electrode body portions 104210 of the second touch electrodes 1042, the force touch wires 102210 can be on the same layer as the bridging lines 1021 according to the abovementioned embodiments so as to save the process. The force touch electrode layer 104 can also be made on the opposing substrate 51, as illustrated in FIG. 22, the capacitance reference layer 201 is made on the OGS substrate, embodiments of the present disclosure are not limited thereto.

Figure 22:
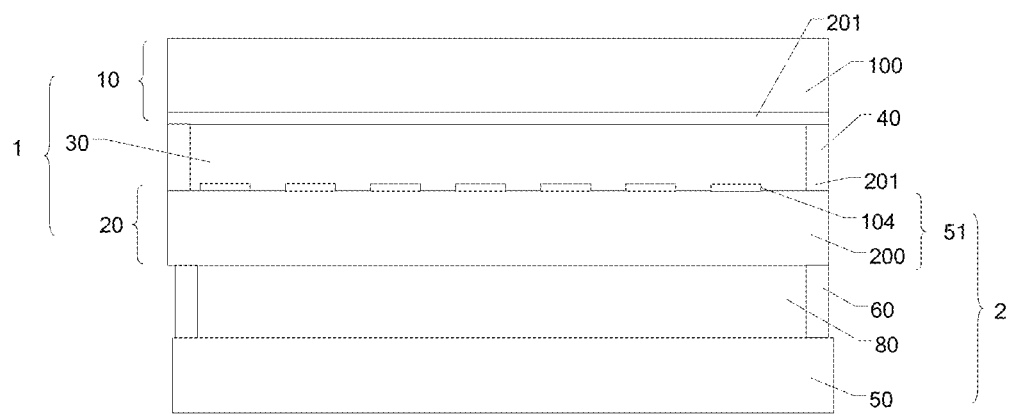
FIG. 22 is a sectional view of a touch display device provided by another embodiment of the present disclosure.
Figure 23:
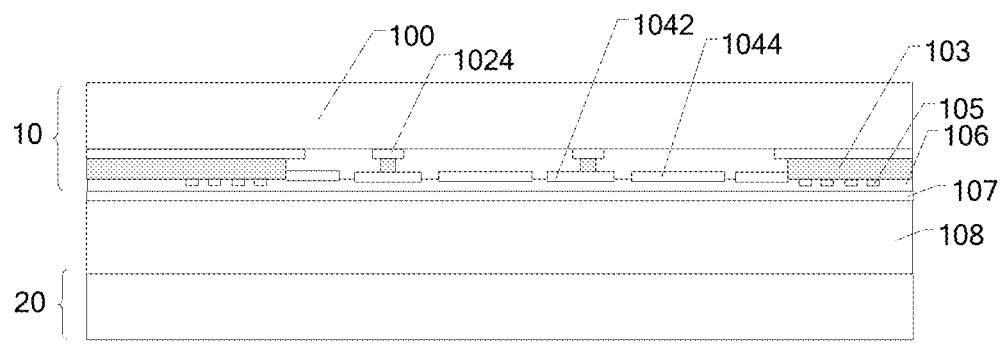
FIG. 23 is a sectional view of a touch display device.

As illustrated in FIG. 23, the FIG. 23 is a sectional view of the touch display device illustrated in FIG. 22 without the plurality of force touch electrodes and the capacitance reference layer. The second substrate 20 and the first substrate 10 can be bonded by an adhesive layer 108. The adhesive layer 108 is a transparent and insulating layer, the adhesive layer 108 can be an optical clear (OC) adhesive. At this moment, the position of the plurality of force touch electrodes can be dummy electrodes 1044. The dummy electrodes 1044 are not applied a voltage, the dummy electrodes 1044 can reduce the risk of ESD breakdown generated by the increase of potential caused by the accumulation of static electricity during the manufacturing process.

Signal interference between the force touch electrodes in embodiments of the present disclosure and the first touch electrodes and the second touch electrodes is not large, so that the respective functions of themselves are not affected. In addition, the IC algorithm can be used to shield the interference to improve the touch experience.

The following statements should be noted:

(1) Unless otherwise defined, the same reference numerals in at least one embodiment and the drawings of the present disclosure represent the same meaning.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a area may be enlarged. However, it should understood that, in the case in which a component or element such as a layer, film, area, substrate or the like is referred to be "on" or "under" another component or element, it may be directly on or under the another component or element or a component or element is interposed therebetween.

(4) In the absence of conflict, the features of the same embodiment and the different embodiments ban be combined with each other.

The foregoing is only the embodiments of the present invention and not intended to limit the scope of protection of the present invention. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A touch panel, comprising:
   a first substrate, comprising a first base substrate and a force touch electrode layer disposed on the first base substrate, the force touch electrode layer comprises a plurality of independent force touch electrodes; and
   a second substrate, comprising a second base substrate and a capacitance reference layer disposed on the second base substrate;
   wherein the first substrate and the second substrate are disposed opposite to each other, and the first substrate and the second substrate have an interval therebetween, and
   the first substrate further comprises a plurality of first touch electrodes and a plurality of second touch electrodes, the plurality of first touch electrodes and the plurality of second electrodes are intersected with each other to form a plurality of force touch unit areas, each of the plurality of force touch electrodes is disposed in one of the plurality of force touch unit areas, the plurality of first touch electrodes, the plurality of second touch electrodes and the plurality of force touch electrodes are insulated from each other.

2. The touch panel according to claim 1, wherein each of the plurality of second touch electrodes comprises a plurality of sub-electrodes which are disconnected, adjacent ones of the plurality of sub-electrodes are electrically connected with each other through a bridging line at a disconnection point; the plurality of first touch electrodes, the plurality of sub-electrodes, and the plurality of force touch electrodes are disposed in a same layer.

3. The touch panel according to claim 2, wherein the first substrate further comprises a force touch wiring layer, the force touch wiring layer comprises the bridging line and a plurality of force touch wiring units; the bridging line is disposed at a gap between adjacent ones of the plurality of force touch wiring units;
   each of the plurality of force touch wiring units comprises a force touch wiring sub-unit, the force touch wiring sub-unit comprises a plurality of force touch wires, in an extending direction of the plurality of force touch wires, lengths of the plurality of force touch wires change in sequence.

4. The touch panel according to claim 3, wherein in each of the plurality of force touch wiring units, the force touch wiring sub-unit and the dummy wiring sub-unit complement each other.

5. The touch panel according to claim 3, wherein each of the plurality of force touch wiring units further comprises a dummy wiring sub-unit, the dummy wiring sub-unit comprises a plurality of dummy wires, in an extending direction of the plurality of dummy wires, lengths of the plurality of dummy wires change in sequence; the extending direction of the plurality of force touch wires is the same as that of the plurality of dummy wires, in a width direction of the plurality of force touch wires, a length change trend of the plurality of force touch wires is opposite to a length change trend of the plurality of dummy wires, the force touch wiring sub-unit and the dummy wiring sub-unit are insulated from each other.

6. The touch panel according to claim 5, further comprising a peripheral wiring layer, wherein the peripheral wiring layer comprises a plurality of peripheral touch wires electrically connected to the plurality of first touch electrodes and the plurality of second touch electrodes respectively, and a plurality of peripheral force touch wires electrically connected to the plurality of force touch wires respectively, a first bonding area of the plurality of peripheral touch wires and a second bonding area of the plurality of peripheral force touch wires are located on opposite sides of the touch panel.

7. The touch panel according to claim 3, further comprising a peripheral wiring layer, wherein the peripheral wiring layer comprises a plurality of peripheral touch wires electrically connected to the plurality of first touch electrodes and the plurality of second touch electrodes respectively, and a plurality of peripheral force touch wires electrically connected to the plurality of force touch wires respectively, a first bonding area of the plurality of peripheral touch wires and a second bonding area of the plurality of peripheral force touch wires are located on opposite sides of the touch panel.

8. The touch panel according to claim 1, wherein the interval comprises a gas layer.

9. The touch panel according to claim 1, further comprising a spacer disposed between the first substrate and the second substrate, and configured to space the first substrate and the second substrate apart.

10. The touch panel according to claim 1, wherein the first substrate or the second substrate has a groove, and the force touch electrode layer or the capacitance reference layer is disposed in the groove.

11. A touch display device, comprising a display panel and the touch panel according to claim 1 on the display panel.

12. A manufacturing method of a touch panel, comprising:
    forming a force touch electrode layer on a first base substrate to prepare a first substrate, wherein the force touch electrode layer comprises a plurality of independent force touch electrodes;
    forming a capacitance reference layer on a second base substrate to prepare a second substrate; and
    disposing the first substrate and the second substrate opposite to each other, so as to form an interval between the first substrate and the second substrate,
    the manufacturing method further comprising forming a plurality of first touch electrodes and a plurality of second touch electrode body portions simultaneously with forming the force touch electrode layer on the first base substrate, wherein each of the plurality of second touch electrode body portions comprises a plurality of sub-electrodes which are disconnected.

13. The manufacturing method of the touch panel according to claim 12, before forming the force touch electrode layer on the first base substrate, the method further comprises forming a force touch wiring layer on the first base substrate, forming a first insulating layer on the force touch wiring layer and forming a first through hole, a second through hole and a third through hole in the first insulating layer, wherein
    the force touch wiring layer comprises a plurality of bridging lines and a plurality of force touch wiring units, each of the plurality of force touch wiring units comprises a force touch wiring sub-unit, the force touch wiring sub-unit comprises a plurality of force touch wires, in an extending direction of the plurality of force touch wires, lengths of the plurality of force touch wires change in sequence;
    one end of the plurality of force touch wires is located at the first through hole, the plurality of force touch electrodes are electrically connected to another end of the plurality of force touch wires through the second through hole;
    the bridging lines are formed in a gap of adjacent ones of the plurality of force touch wiring units, adjacent ones of the sub-electrodes are electrically connected to the plurality of bridging lines corresponding to a disconnection point of the plurality of sub-electrodes; the plurality of second touch electrode body portions are electrically connected to the plurality of bridging lines through the third through hole to form a plurality of second touch electrodes.

14. The manufacturing method of the touch panel according to claim 13, further comprising forming a dummy wiring sub-unit of each of the plurality of force touch wiring units, the dummy wiring sub-unit comprises a plurality of dummy wires, in an extending direction of the plurality of dummy wires, lengths of the plurality of dummy wires change in sequence; the force touch wiring sub-unit and the dummy wiring sub-unit are insulated from each other.

15. The manufacturing method of the touch panel according to claim 14, wherein in each of the plurality of force touch wiring units, the force touch wiring sub-unit and the dummy wiring sub-unit complement each other.

16. The manufacturing method of the touch panel according to claim 13, after forming the force touch electrode layer, the method further comprises forming a peripheral wiring layer, wherein the peripheral wiring layer comprises a plurality of peripheral touch wires electrically connected to the plurality of first touch electrodes and the plurality of second touch electrodes respectively, and a plurality of peripheral force touch wires electrically connected to the plurality of force touch wires respectively, a first bonding area of the plurality of peripheral touch wires and a second bonding area of the plurality of peripheral force touch wires are located on opposite sides of the touch panel.

* * * * *